United States Patent
Peng

(10) Patent No.: US 8,262,308 B2
(45) Date of Patent: Sep. 11, 2012

(54) COUPLING STRUCTURE FOR A CASING

(75) Inventor: Wen-Yu Peng, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 100 days.

(21) Appl. No.: 12/859,473

(22) Filed: Aug. 19, 2010

(65) Prior Publication Data

US 2011/0318089 A1 Dec. 29, 2011

(30) Foreign Application Priority Data

Jun. 24, 2010 (TW) .............................. 99211984 U

(51) Int. Cl.
*F16L 35/00* (2006.01)
(52) U.S. Cl. ............. 403/20; 403/311; 285/39; 285/419
(58) Field of Classification Search ............. 403/16, 403/19, 20, 310, 311, 344; 285/39, 419, 285/373, 921
See application file for complete search history.

(56) References Cited

U.S. PATENT DOCUMENTS

| 4,219,693 | A | * | 8/1980 | French | 174/135 |
| 4,600,220 | A | * | 7/1986 | Agnelli | 285/80 |
| 4,795,197 | A | * | 1/1989 | Kaminski et al. | 285/12 |
| 4,797,512 | A | * | 1/1989 | Kumagai et al. | 174/135 |
| 4,854,665 | A | * | 8/1989 | Gagnon | 385/100 |
| 5,015,013 | A | * | 5/1991 | Nadin | 285/64 |
| 5,435,425 | A | * | 7/1995 | Ijames | 192/13 R |
| 6,257,792 | B1 | * | 7/2001 | Read, Jr. | 403/16 |
| 6,311,734 | B1 | * | 11/2001 | Petrovic | 138/110 |
| 6,376,774 | B1 | * | 4/2002 | Oh et al. | 174/92 |
| 6,561,466 | B1 | * | 5/2003 | Myers et al. | 248/74.4 |
| 6,761,189 | B2 | * | 7/2004 | Berninger et al. | 138/157 |
| 7,226,234 | B2 | * | 6/2007 | Gordy et al. | 403/344 |
| 7,300,078 | B2 | * | 11/2007 | Yamamoto et al. | 285/420 |
| 2008/0191106 | A1 | * | 8/2008 | Shiffler et al. | 248/188.9 |

* cited by examiner

*Primary Examiner* — Joshua Kennedy
(74) *Attorney, Agent, or Firm* — Rosenberg, Klein & Lee

(57) ABSTRACT

A coupling structure for coupling first and second halves into a casing, includes a first coupling element projecting outward from an inner surface of the first casing half and formed with a detachment hole and a second coupling element projecting outward from an inner surface of the second casing half and for engaging with the first coupling element. Insertion of a detachment tool via an opening in the casing and the detachment hole to abut against the second coupling element results in inward bending of the second coupling element with respect to the first coupling element, thereby disengaging the second coupling element from the first coupling element, hence the first casing half disengages from the second casing half.

7 Claims, 6 Drawing Sheets

COUPLING STRUCTURE FOR A CASING

This application claims the benefits of the Taiwan Patent Application Serial NO. 099211984 filed on Jun. 24, 2010, the subject matter of which is incorporated herein by reference.

BACKGROUND OF THE INVENTION

1. Field of the Invention

The present invention relates to a coupling structure, more particularly to a coupling structure for coupling first and second casing halves in order to form a casing and the casing is easily detachable if required.

2. Description of the Prior Art

An outer casing of an electronic device is hold in form generally by fastener strap means or fastener screws. In the event, fastener screws are used for fastening the casing, manual labor is required during the assembly process, thereby exhausting the laborer. In addition, other people can see the fastening places by a casual look and tends to persuade to disengage the casing, thereby resulting in theft of inner components. In case the casing is fastened via the fastener strap means, the casing is prevented from being opened by those unskilled persons due to difficulties in disengaging the casing, thereby preventing from theft. However, implementation of fastener strap means in the casing may cause inconvenience when repairing or recycling of the parts is required.

Due to the abovementioned reasons, the inventor of the present invention has devoted tremendous efforts to invent a novel coupling structure for use in a casing such the casing can be detached easily and quickly into parts if required.

SUMMARY OF THE INVENTION

In order to solve the drawbacks of the prior art coupling structure, it is the main object of the present invention is to provide a easily detachable coupling structure for use in a casing so that the present coupling structure is free of the disadvantages and includes a first coupling element formed with a detachment hole to permit extension of a detachment tool to abut against a second coupling element, thereby disengaging the first and second coupling element relative to each other.

The coupling structure according to the present invention is used for coupling first and second casing halves into a casing, and includes a first coupling element and a second coupling element. The first coupling element projects outward from an inner surface of the first casing half and is formed with a detachment hole midway to a detachment direction. The second coupling element projects outward from an inner surface of the second casing half midway to the detachment direction and is adapted to be engaged with the first coupling element. Insertion of a detachment tool along the detachment direction via the detachment hole in the casing in order to press against the second coupling element results in inward bending of the second coupling element with respect to the first coupling element, thereby disengaging the second coupling element from the first coupling element, hence the first casing half disengages from the second casing half.

In one embodiment of the present invention, the first coupling element is further formed with a hook at a lower elevation of the detachment hole. The second coupling element is formed with a hooking groove for receiving the hook, thereby coupling the first and second casing halves into the casing.

In another embodiment of the present invention, the first coupling element is further formed with a hooking groove adjacent to the detachment hole. The second coupling element is further formed with a hook for engaging in the hooking groove, thereby coupling the first and second casing halves into the casing.

In yet another embodiment of the present invention, the detachment tool is a push rod or a pin rod. Preferably, one of the first and second casing halves is formed with a tool retention bore accessible from one end thereof in order to retain the detachment tool therein when the latter is not in use.

The coupling structure of the present invention is more convenient and easier to disengage when compared to that of the prior art coupling structure. The reasons reside in that the detachment tool can be inserted into the casing along the detachment direction via the detachment hole in the first coupling element to abut against and pushes the abutment portion of the second coupling element, which, in turn, results in removal of the hook from the hooking groove in the second coupling element, thereby disengaging the first and second coupling elements, hence the first casing half disengage from the second casing half.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
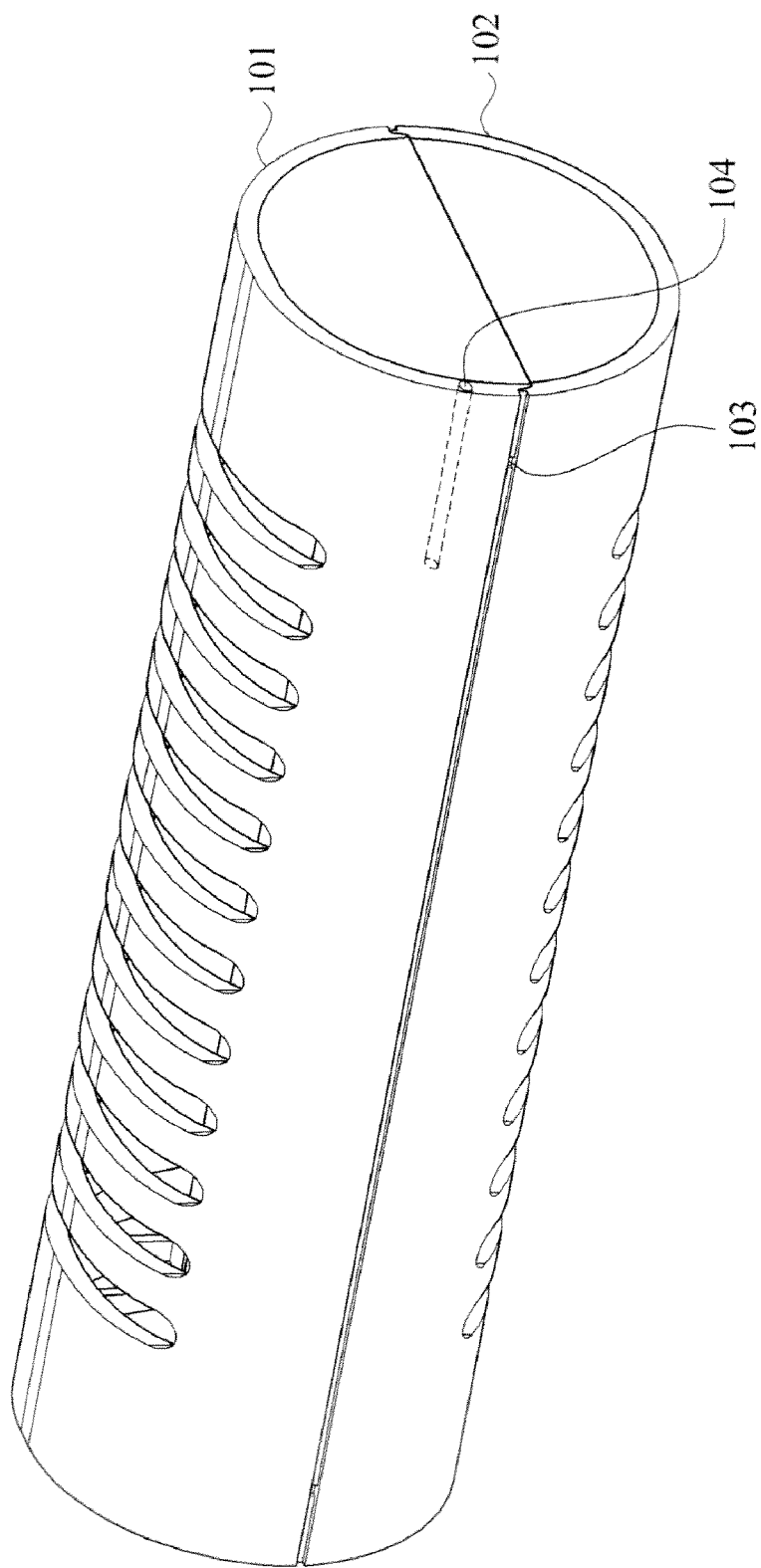
FIG. 1 is a perspective view of a casing of an electronic device, in which the coupling structure of the present invention has been implemented for forming the casing.
Figure 2:
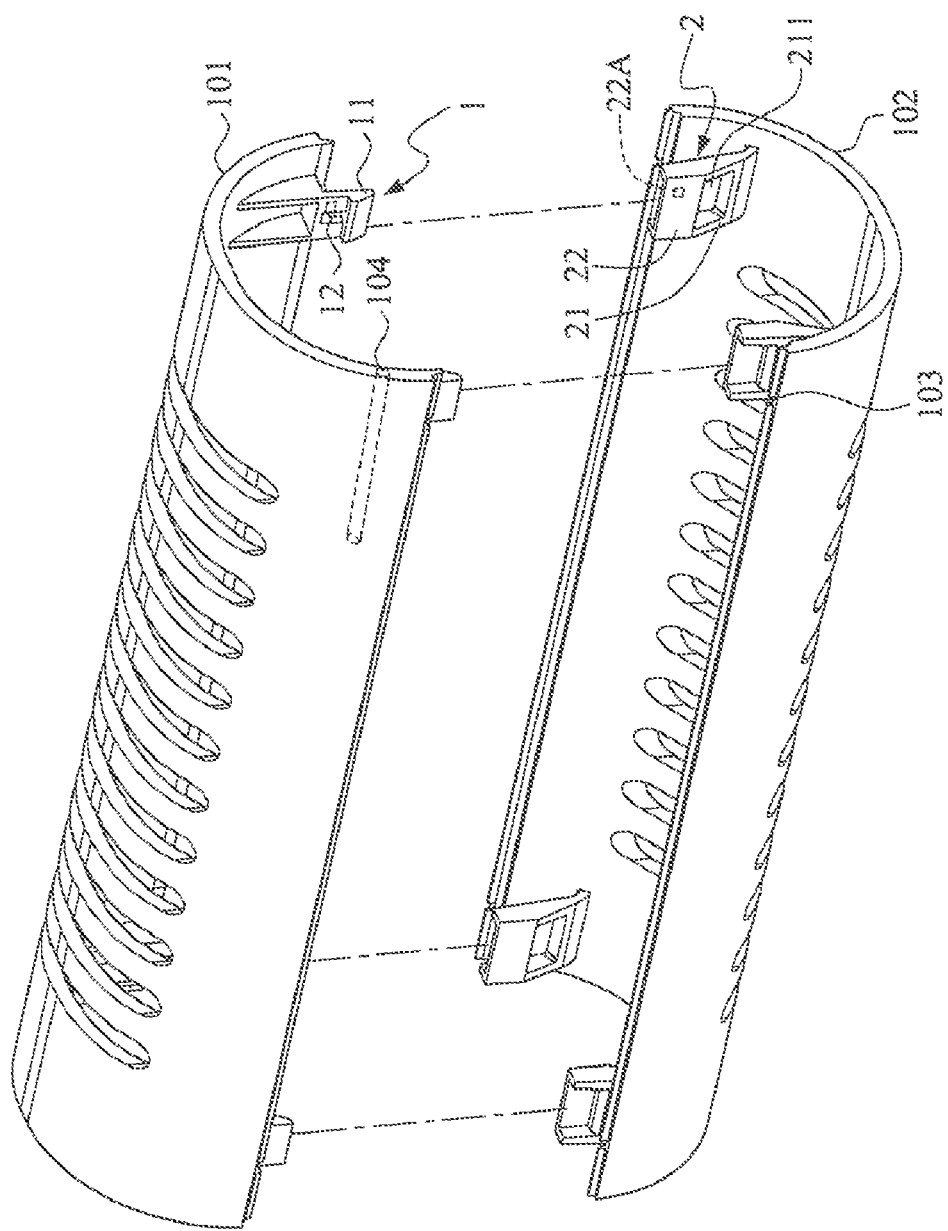
FIG. 2 is an exploded view of the casing of the electronic device to illustrate how the coupling structure of the present invention is implemented therein.

Referring to FIGS. 1 and 2, wherein FIG. 1 is a perspective view of a casing of an electronic device, in which the coupling structure of the present invention has been implemented for forming the casing while FIG. 2 is an exploded view of the casing of the electronic device to illustrate how the coupling structure of the present invention is implemented therein. The coupling structure of the present invention is used for coupling first and second casing halves 101, 102 into the casing as best shown in FIG. 1. Once the first and second casing halves 101, 102 are coupled together, the casing is formed with an opening 103 (see FIG. 1) via which a detachment tool 200 (see FIG. 4) can be inserted along a detachment direction (I) in order to disengage the first casing half 101 from the second casing half 102.

In this embodiment, each of the first and second casing halves 101, 102 has contact edges which overlapped with one another once the first and second casing halves 101, 102 are coupled together such that the opening 103 is formed on the overlapping position of the second casing half 102 and is visible from an exterior of the casing. At the same time, another opening 103A (not visible) is formed on the overlapping position of the first casing half 101 and is visible only from an interior of the casing and is in spatial communication with the opening 103.

Preferably, the detachment tool 200 is a push rod or a pin rod. In practice, any object that can be inserted through the openings 103, 103A and that can detached the first casing half 101 from the second casing half 102 can serve as the detachment tool 200. One of the first and second casing half 101, 102 is preferably formed with a tool retention bore 104 (see FIG. 1) accessible from one end thereof in order to retain the detachment tool 200 therein.

Figure 3:
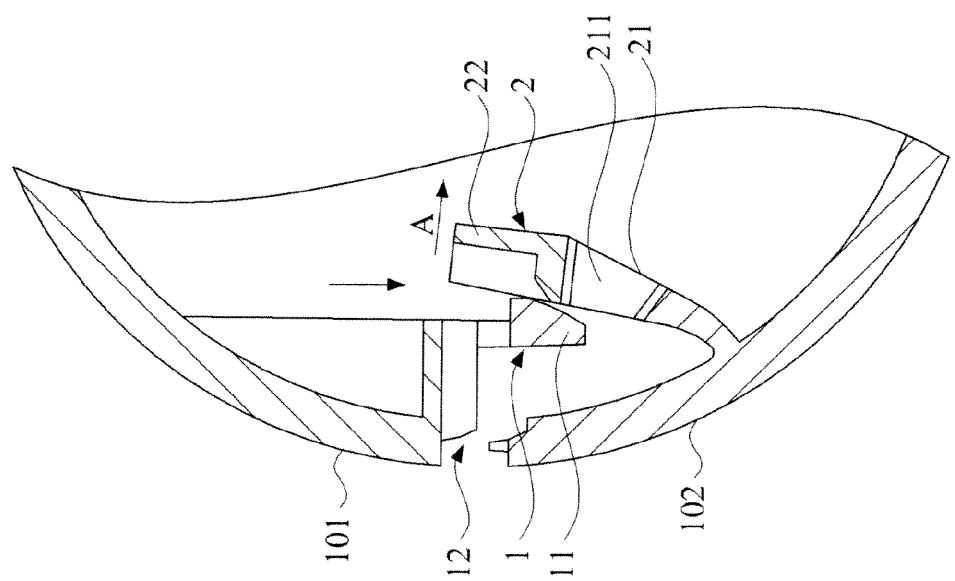
FIG. 3 is a fragmentary sectional view to illustrate how first and second casing halves engage together to form the casing due to implementation of the coupling structure of the present invention.

FIG. 3 is a fragmentary sectional view to illustrate how first and second casing halves engage together to form the casing due to implementation of the coupling structure of the present invention. The coupling structure of the present invention includes a first coupling element 1 and a second coupling element 2. The first coupling element 1 projects inward from an inner surface of the first casing half 101 and is formed with a detachment hole 12 that is located transverse to the detachment direction (I) and that is in spatial communication with the opening 103 (see FIG. 1) in the casing in order to permit extension of the detachment tool 200 once the detachment tool 200 is inserted into the casing, detail of which will be explained later. The first coupling element 1 is further formed with a hook 11 at a lower elevation of the detachment hole 12.

The second coupling element 2 projects inward from an inner surface of the second casing half 102 and is adapted to be engaged with the first coupling element 1 in order to form the casing. The second coupling element 2 has an abutment portion 22 and a hooking portion 21 that is located at an elevation below the abutment portion 22 and that is formed with a hooking groove 211 for receiving the hook 11, thereby coupling the first and second casing halves 101, 102 into the casing.

FIGS. 3 to 6 respectively illustrate engagement and disengagement of the first and second coupling elements 1, 2 of the coupling structure of the present invention when implemented in the casing. FIG. 3 is a fragmentary sectional view of the casing to illustrate how first and second casing halves engage together due to implementation of the coupling structure of the present invention. During the coupling process to form the casing, the first casing half 101 is disposed above the second casing half 102 and is pressed downward relative to the second casing half 102, where the hook 11 of the first coupling element 11 slides frictionally past the abutment portion 22 of the second coupling element 2 and simultaneously results in bending of the abutment portion 22 in a bending direction (A) [permitting sliding past of the hook 11] to engage the hooking groove 211, thereby coupling the first and second casing halves 101, 102 into the casing.

Figure 4:
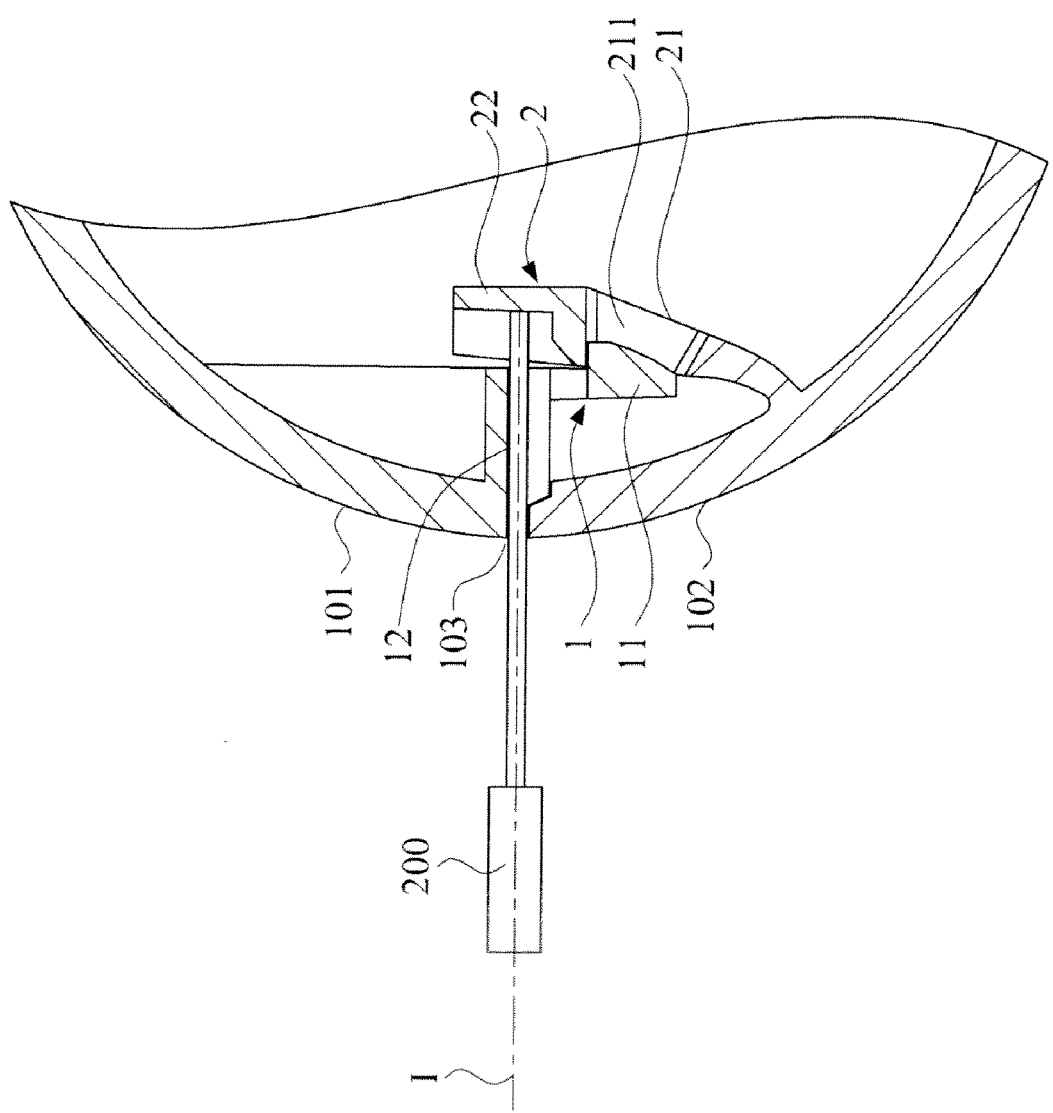
FIG. 4 is a fragmentary sectional view of the casing provided with of the coupling structure of the present invention to illustrate how a detachment tool is inserted into the casing for disengaging the first and second casing halves relative to each other.
Figure 5:
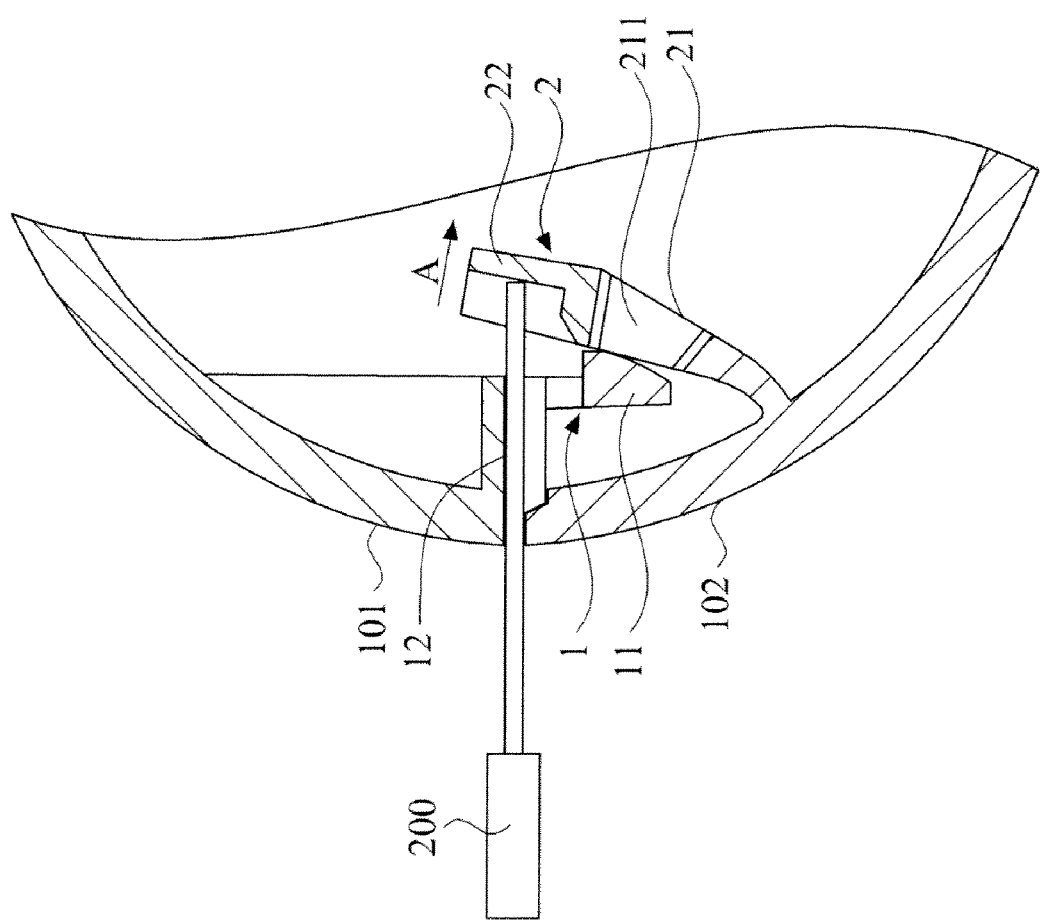
FIG. 5 is a fragmentary sectional view of the casing provided with of the coupling structure of the present invention to illustrate relative movement between first and second coupling elements due to insertion of the detachment tool into the casing for disengaging the first and second casing halves relative to each other.
Figure 6:
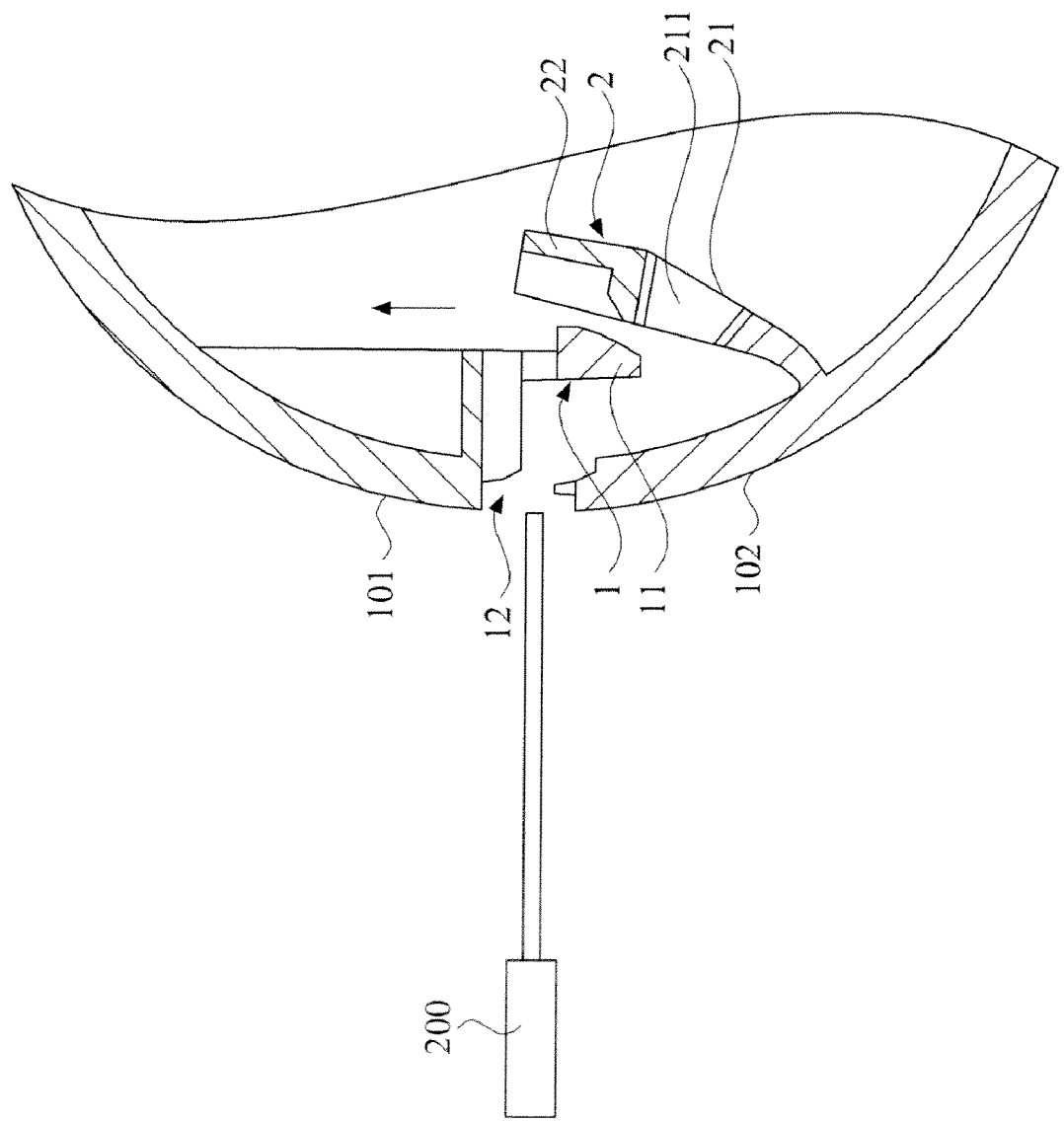
FIG. 6 is a fragmentary sectional view of the casing provided with of the coupling structure of the present invention to illustrate how the first and second casing halves disengaging relative to each other.

FIG. 4 is a fragmentary sectional view of the casing provided with of the coupling structure of the present invention to illustrate how the detachment tool 200 is inserted into the casing for disengaging the first and second casing halves 101, 102 relative to each other. As illustrated, the detachment tool 200 is inserted along the detachment direction (I) via the opening 103 and the detachment hole 12 in order to push against the abutment portion 22 of the of the second coupling element 2 and simultaneously results in bending of the abutment portion 22 in a bending direction (A) and permitting removal of the hook 11 from the hooking groove 211, [hence engaging the hook 11 from the hooking groove 211], as best shown in FIG. 5, thereby disengaging the first and second casing halves 101, 102 relative to each other (see FIG. 6).

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A coupling structure for coupling first and second casing halves into a casing, comprising:
   a detachment tool storable in a tool retention bore formed in said casing;
   an opening formed at an overlapping position of said first and second casing halves of said coupled casing;
   a first coupling element projecting inward from an inner surface of the first casing half and formed with a detachment hole, said detachment hole in open communication with said opening to permit extension of said detachment tool therein; and
   a second coupling element projecting inward from an inner surface of the second casing half for engaging the first coupling element;
   wherein said casing is matingly engaged by aligning said first and second casing halves to engage said first and second coupling elements, and disengaged by inserting said detachment tool into said detachment hole through said opening to abut said second coupling element resulting in inward bending of said second coupling element with respect to said first coupling element, thereby disengaging said second coupling element from said first coupling element.

2. The coupling structure as defined in claim 1, wherein said opening is formed either in the first casing half or the second casing half.

3. The coupling structure as defined in claim 1, wherein the detachment tool is a push rod or a pin rod.

4. The coupling structure as defined in claim 1, wherein said first coupling element is further formed with a hook at an end thereof, said second coupling element being formed with a hooking groove for receiving said hook.

5. The coupling structure as defined in claim 4, wherein said second coupling element has an abutment portion and a hooking portion formed at a distal end, whereby insertion of the detachment tool via the opening and said detachment hole in the casing abuts said abutment portion to disengage said second coupling element from said first coupling element.

6. The coupling structure as defined in claim 1, wherein said first coupling element is further formed with a hooking groove adjacent to said detachment hole, said second coupling element being further formed with a hook for engaging in said hooking groove, thereby coupling the first and second casing halves into the casing.

7. The coupling structure as defined in claim 6, wherein said second coupling element has an abutment portion formed with said hook and a hooking portion located at a distal end thereof, whereby insertion of the detachment tool via the opening and said detachment hole in the casing abuts said abutment portion resulting in inward bending of said second coupling element with respect to said first coupling element, thereby disengaging said second coupling element from said first coupling element.

* * * * *